United States Patent Office 3,560,246
Patented Feb. 2, 1971

---

3,560,246
METHOD FOR CATALYZING POLYUREA COATINGS
Billy D. Payne, Cleveland, and James W. Watson, Parma, Ohio, assignors to SCM Corporation, Cleveland, Ohio
No Drawing. Filed Apr. 26, 1968, Ser. No. 724,610
Int. Cl. B44d *1/28, 1/14*; B32b *21/08*
U.S. Cl. 117—72                                                12 Claims

ABSTRACT OF THE DISCLOSURE

A novel method for catalyzing the formation of polyurea by the reactions between polyfunctional-isocyanates and polyfunctional-imines through the presence of an effective amount of a phenolic catalyst is provided. One particularly important embodiment comprises the formation of polyurea film coatings on wood substrates by reacting alkylene diisocyanates and alkylene diimines in the presence of a chloro-substituted phenol.

---

This invention relates to catalyzing polyurea coatings. More particularly, this invention pertains to a novel method for catalyzing modified polyurea coatings on treated or untreated wood substrates.

The term "polyurea" is well known in the art and refers to a polymeric condensation reaction product of polyfunctional-isocyanates and polyfunctional-amines. This reaction can be expressed:

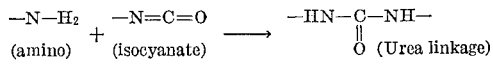

Polyureas are well known for their strength, hardness and chemical durability; but until recently, have not found wide commercial acceptance as coating materials because of the rapid rate of reaction between the polyfunctional-amine and the polyfunctional-isocyanate. In fact, this reaction is so fast that the pot-life is extremely short and gelation often occurs before a commercially acceptable coating can be applied to, and formed on, the substrate.

Recently, a technique has been developed for controlling the reaction between the polyfunctional-amine and polyfunctional-isocyanate by "blocking" the polyfunctional-amine with organic carbonyl compound (an aldehyde or ketone) to form a polyfunctional-amine. This polyfunctional- imine has the functional group

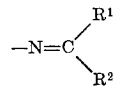

wherein R¹ and R² are hydrogen or hydrocarbyl groups contributed by the aldehyde or ketone. Compounds having the

functional groups are known in the art as "ketimines," and are formed by the reversible reaction:

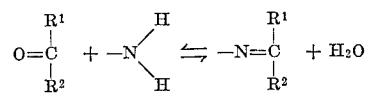

(Ketone or aldehyde)  (Amine)  (Ketine)

Compounds having two or more functional

are known as "polyfunctional-ketimines." In the presence of water (such as atmospheric humidity), the ketimine linkage hydrolyzes to "unblock" the polyfunctional-amine according to the above reversible reaction. The condensation reaction then takes place between the polyfunctional-amine and the polyfunctional-isocyanate to form the polyurea and the liberated ketone or aldehyde volatilizes from the system. Unfortunately, polyureas formed in this manner often require prolonged curing periods to achieve a tough, hard, glossy, weather resistant coating.

This invention is directed to a novel and economical method for catalyzing the curing reaction in this polyfunctional-imine/polyfunctional-amine/polyfunctional-isocyanate system to produce hard, tough, weather resistant, chemically durable, polyurea coatings, using conventional application techniques, and short curing periods at low temperatures.

As used herein, the term "isocyanate" refers to a chemical compound containing one or more $(N{=}C{=}O)$ groups. The "functionality" of a given isocyanate indicates the number of $(N{=}C{=}O)$ groups that are present in a molecule of the isocyanate compound. For example, when the isocyanate molecule contains two $(N{=}C{=}O)$ groups, it is said to be difunctional. "Polyfunctional" is used to characterize molecules having two or more reactive groups. Similar nomenclature is used in describing the functionality of the imines and amines.

To form a uniform polyurea coating, the isocyanate and the amine must be at least difunctional. Difunctionality tends to produce linear polyureas with minimal cross linking. Such polyurea coatings are tough, hard and weather resistant. When three or more functional groups are present, the degree of structural cross linking increases with increasing functionality. It is known that highly cross-linked polyurea structures are quite brittle and lack toughness. For this reason, difunctional and trifunctional isocyanates and amines are preferred in forming tough, hard polyurea coatings.

Accordingly, the isocyanate is defined as a compound of the formula $R(N{=}C{=}O)_x$ wherein R is a saturated hydrocarbyl (e.g., aliphatic, cycloaliphatic or aromatic) group having a valance equal to X wherein X is an integer from 2 to 4 inclusive. Usually, R is alkylene and the isocyanate is a diprimary diisocyanate for the reasons discussed above.

There are numerous compounds within this formula that are suitable for the present purposes and no attempt will be made to present an exhaustive list. The following compounds are considered illustrative and will suggest to those skilled in the art a variety of others: alkylene diisocyanates such as ethylene diisocyanate, trimethylene diisocyanate, tetramethylene diisocyanate, hexamethylene diisocyanate, decamethylene diisocyanate; cyclo-alkylene diisocyanates such as cyclopentylene diisocyanate, cyclohexylene diisocyanates; aromatic diisocyanates such as m-phenylene diisocyanate, naphthalene diisocyanate, diphenyl-4, 4' diisocyanate; aliphatic-aromatic diisocyanates such as tolylene 2,4 diisocyanate, tolylene 2,6 diisocyanate, xylene-1, 4 diisocyanate, diphenylene methane diisocyanate; and isocyanates having three or more isocyanate groups such as butane-1, 2, 2 triisocyanate, benzene 1, 3, 5 triisocyanate, diphenyl-2, 2, 4' triisocyanate, diphenyl-4, 6, 4' triisocyanate, toluene-2, 4, 6 triisocyanate, ethyl benzene-2, 4, 6 triisocyanate, and triphenyl methane 4, 4', 4" triisocyanate.

As mentioned above, these polyfunctional-isocyanates react with the polyfunctional-amines to form polyureas according to a rapid reaction. To control this reaction, the polyfunctional-amine is mixed with polyfunctional-isocyanate in the form of a polyfunctional-imine ("carbonyl blocked" polyfunctional-amine formed by reacting the polyfunctional-amine with a ketone or aldehyde). Typically, an alkylene diimine (formed from an alkylene diamine) of the formula is employed:

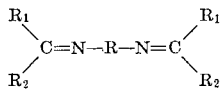

In this formula, $R^1$ and $R^2$ have the meanings assigned above, and R has the meaning assigned hereinafter. Suitable polyfunctional-imines are available commercially. These polyfunctional-imines while in physical admixture with the polfunctional-isocyanate readily hydrolyze, in situ, under ambient humidity conditions, to form the free polyfunctional-amine and to free ketone. The free polyfunctional-amine is then available to react with the polyfunctional-isocyanate to form the polyurea.

The polyfunctional-imines can be described as the reaction product of an amine of the formula $R(NH_2)_X$ wherein R is a saturated hydrocarbyl (e.g., aliphatic, cycloaliphatic or aromatic) group having a valence equal to X wherein X is an integer from 2 to 4 inclusive; and a ketone or aldehyde. The hydrocarboyl groups associated with the ketone or aldehyde are not important since these groups do not enter into the reaction. Lower ketones and aldehydes are generally used because these compounds are readily volatilized during the coating curing period.

In the above formula, R is usually alkylene, and the polyfunctional-amine is a primary diamine for the reasons discussed above. Suitable primary diamines include ethylenediamine, tetramethylenediamine, pentamethylenediamine, hexamethylenediamine, heptamethylenediamine, octamethylenediamine, p-xylylenediamine 1,4-diaminocyclohexane, p-phenylenediamine, 1-methyl-2, 4-diaminobenzene, bis (p-aminocyclohexyl) methane and the like. Other polyfunctional-amines include butane 1, 2, 3, tri-amine, diphenyl-2, 2, 4′ tri-amine and so on.

According to the present invention, the curing reaction between polyfunctional-isocyanates and polyfunctional-amines (which are liberated by the in situ hydrolysis of polyfunctional-imines) is catalyzed by the presence of a small amount (up to about 5% by weight) of a compound of the formula:

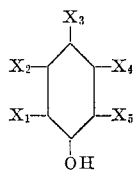

wherein $X_1$, $X_2$, $X_3$, $X_4$, and $X_5$ are members selected from the group consisting of hydrogen and halogen.

The halogens, of course, include iodine, bromine, chlorine and fluorine, of which chlorine is preferred.

In one particularly important embodiment of the present invention, pentachlorophenol is the catalyst. This is particularly important because pentachlorophenol is a known preservative for wood and other cellulosic materials.

Polyurea coatings formed according to the present invention are self-priming and provide the unusual combination of tensile strength, inherent flexibility and extensibility, making them particularly suitable to dimensionally unstable woods such as soft pines, cedar and the like. This polyurea coating is also an excellent exterior coating for various plywood and particle board substrates.

Polyurea coatings formed according to the present invention are useful as protective, abrasion resistant, chemically durable coatings on a wide variety of substrates. For example, clear polyureas make excellent damages preventive coatings for glass, wood, metal, ceramic, paper or plastics when transparent, abrasion resistant coatings are required. Additionally, polyureas can also be pigmented to almost any color and luster to provide protective decorative coatings on substrates such as metal, asbestos, paper, wood, ceramic, etc.

Polyureas coatings find particular utility in the homebuilding and mill working industries in that they provide a complete, self-priming, finishing system for construction grade woods. This is particularly true in the case of soft woods, such as pine, since polyurea tends to stabilize these soft woods against excessive dimensional change. Polyureas are also excellent coating materials for other cellulosic substrates such as particle board, hardboard and plywood.

The primary advantage of the present invention, however, is the rapid curing of the polyurea coating. Without this phenolic catalyst, curing periods of 2 or 3 hours or longer at temperatures up to 180° F. are common. When the phenolic catalyst is present, the curing period is reduced to about 10–20 minutes under comparable conditions. The advantage of this system can be appreciated when considering the amount of millwork lumber that must be treated and stored in a warehouse while the coating cures.

In practicing the present invention, the polyfunctional-isocyanate and the polyfunctional-imine are mixed together, at room temperature, to form the polyurea coating mixture. In one embodiment, a catalytic amount of a phenolic compound of the formula:

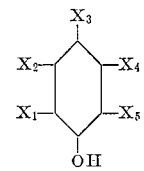

wherein $X_1$, $X_2$, $X_3$, $X_4$, and $X_5$ are members selected from the group consisting of hydrogen and halogen is present in an amount corresponding to about 0.1% to about 5% by weight of the coating mixture. Catalyst concentrations in the range of 0.5% to 3% are used in the interest of economic practicality. Standard additives such as pigments, extenders, and fillers can also be incorporated into the coating mixture. If desired, this mixture can be diluted with a moisture free, suitable solvent (e.g., hexane, heptane, xylene or toluene) to reduce viscosity and improve spreadability. Dilution will also tend to increase the pot-life of the coating mixture.

The polyfunctional-isocyanate, the polyfunctional-imine, and the phenolic catalyst can be mixed in the mixing nozzle of a multicomponent spray gun at the time of application to the substrate. In this second embodiment, the phenolic catalyst functions effectively, and pot-life is not a problem.

As a third alternative, when porous substrates such as wood are being coated, the substrate can be treated with the phenolic catalyst prior to the application of a mixture of polyfunctional-isocyanate and polyfunctional-imine. The catalyst is then present at the substrate-coating interface and is effective in promoting the curing rate.

In any case, about 3 to 5 wet mils of coating is laid down onto the wood substrate (this dries to a film thickness of about 2 to 4 mils). The coating is then dried for about 10 to 15 minutes at temperatures of up to 180° F.; usually temperatures in the range of about 100 to 150° F. are commercially expedient. At curing temperatures below 100° F., time periods of 30 minutes or more may be required to achieve a full, hard cure.

For particularly severe conditions of exterior exposure, two, three or more layers of polyurea can be built up in successive applications to achieve the required performance specification. Under ordinary conditions of outdoor exposure for pine lumber, two layers (each layer 2 dry mils in thickness) are satisfactory. Under these conditions, polyurea acts as a "self-primer."

Alternatively, standard primers such as alkyds, polyesters, acrylics, polyurethanes, epoxides, etc. can be used.

Polyurea coatings are then built up on the primer basecoat according to the method described above.

The following examples are illustrative of the practice of the present invention although they should not be construed as limiting. All parts and percentages are by weight unless otherwise specified.

EXAMPLE 1

A catalyzed polyfunctional-imine/polyfunctional-isocyanate coating solution was prepared by mixing 95 parts of a difunctional ketimine, 105 parts of a difunctional isocyanate, and 50 parts of commercial grade pentachlorophenol in 750 parts of xylene at about 100° F. in a stirred reaction vessel. This solution contains the equivalent of 20% by weight "polyurea."

The difunctional ketimine is a long chain alkylene diimine blocked with methyl isobutyl ketone.

This ketimine has a molecular weight of about 1,100, and an equivalent weight of about 275, and is a clear amber liquid of medium viscosity. It is sold by General Mills under the name "Modified Amine A–100."

The difunctional isocyanate has the formula:

$$OCN-(CH_2)_{36}-NCO$$

This isocyanate has a molecular weight of about 600, and an equivalent weight of about 300. This material is a clear amber liquid of low viscosity and is sold by General Mills under the name "DDI Brand Diisocyanate."

Several pine panels, (about 18 inches x 8 inches x 1 inch) were dipped into this coating solution. The coating mixture dried in about ½ hour at 130° F. into a clear, hard, tough, polyurea coating. This coating was suitable for exposure as is; or as a prime coat for subsequent layers of polyurea.

EXAMPLE 2

A catalyzed polyfunctional-isocyanate/polyfunctional-imine coating solution was prepared by mixing 52.4 parts of the polyfunctional-imine of Example 1 with 57.0 parts of the polyfunctional-isocyanate of Example 1 with 3.6 parts of 3% solution of pentachlorophenol in xylene, in 100 parts of xylene.

This solution was sprayed on a glass lens that had been heated to a temperature of about 180° F. A clear, hard, abrasion resistant film resulted on the glass lens.

EXAMPLE 3

A polyfunctional-imine mixture was prepared by mixing 300 parts of the polyfunctional-imine of Example 1, 590 parts of pigment grade titania powder, (Du Pont Grade R–960) and 59 parts of a water suspension of finely divided silica as an extender, into 289 parts of xylene at a temperature of about 120° F. Mixing was continued until a stable suspension was achieved.

The resulting suspension was white in color and had the following composition:

| | Percent |
| --- | --- |
| Polyfunctional-imine | 24 |
| Titania | 47.5 |
| Silica | 5 |
| Xylene | 23.5 |

EXAMPLE 4

A polyfunctional-isocyanate mixture was prepared by mixing 700 parts of the polyfunctional-isocyanate of Example 1 with 76 parts of toluene.

Mixing was carried out at 120° F. until a clear solution resulted.

EXAMPLE 5

One part of the solution prepared in Example 4 was mixed with 3.1 parts of the suspension prepared in Example 3 to form a coating mixture.

The mixture was sprayed on a pine panel to form a uniform coating of 3 mils wet thickness. The coated panel was cured at about 120° F. in an oven that was open to the ambient. Under these conditions, about 3 hours of curing time were required to fully cure the polyurea coating. The dried coating thickness was about 2 mils.

EXAMPLE 6

The experimental procedure of Example 4 was followed except that 1% pentachlorophenol was incorporated into the coating mixture (1% based on the weight of coating mixture).

Under similar curing conditions, a white, hard, tough, glossy, chemically durable polyurea coating of about 2 mils in thickness resulted in about 20 minutes.

Several coated pine panels prepared according to this example were exposed individually to various chemicals at room temperature, several days. The cured films were not deteriorated by ethanol, methyl isobutyl ketone, mineral spirits, oleic acid, acetic acid, sodium hydroxide, sulfuric acid toluene, water and xylene.

Similar results can be achieved by mixing the imine component (Example 3) with the isocyanate component (Example 4) in a spray gun equipped with a mixing nozzle. When this technique is employed the phenolic catalyst can be added to either component.

EXAMPLE 7

Several of the panels prepared in Example 1 were further coated by the method disclosed in Example 6. In this example, the treatment of Example 1 functions as a primer coat. The pigmented coating according to Example 6 cured in about 20 minutes at 120° F. as did the coating in Example 6.

The combined polyurea coating thickness was about 4–5 mils and was extremely glossy, tough and durable. Wood treated in this manner is suited for prolonged periods of exterior exposure.

EXAMPLE 8

Several untreated pine panels were spray-primecoated using a conventional spray gun and technique, with 1–2 mils of an ordinary alkyl (phthalic anhydride-glycerol-soybean oil) resin, and cured at about 140° F. for 20 minutes.

These alkyd primed panels were then further coated by the method of Example 6, and a dual coated panel having properties similar to the properties of the panels produced in Example 7, was obtained.

EXAMPLE 9

Untreated pine panels (about 18 inches x 8 inches x 1 inch) were soaked in a 5% (by weight) solution of pentachlorophenol in xylene, at room temperature, for about 3 to 5 minutes. After this immersion period, the pine panels were allowed to dry overnight at room temperature.

These pine panels were then treated according to the method of Example 5. Suprisingly, these panels required only about ½ hour of curing time to produce a hard, glossy, tough, chemically-durable, polyurea coating film.

This example demonstrates that the curing of a polyurea film is catalyzed by the presence of pentachlorophenol on the coated substrate. Apparently, the pentachlorophenol exerts catalytic influence across the coating-substrate interface.

From the foregoing, it is apparent that a novel method of catalyzing the formation of polyurea coating has been discovered and developed.

The following example demonstrates that a large mass of (as opposed to a film) polyurea can be polymerized by the present methods. Accordingly, it is possible to form solid polyurea articles by casting and other well known forming techniques using the present invention.

EXAMPLE 10

Part A

Fifteen (15) grams of the mixture of Example 4 was mixed with 54 grams of the mixture of Example 3 in an open reaction vessel at room temperature. After thorough mixing the reaction mass was allowed to stand at room temperature.

The reaction mass converted to a firm, hard polyurea gel after about 6 hours.

Part B

The method of part A was repeated except that pentachlorophenol was incorporated into the reaction mass in an amount comprising about 0.1% by weight of the reaction mass. A firm, hard polyurea gel formed upon standing for only 2 hours.

Part C

The method of part A was repeated except that pentachlorophenol was incorporated into the reaction mass in an amount comprising about 0.5% by weight of the reaction mass. A firm, hard polyurea gel formed upon standing for only 1½ hours.

Part D

The method of part A was repeated except that pentachlorophenol was incorporated into the reaction mass in an amount comprising about 1.0% by weight of the reaction mass. A firm, hard polyurea gel formed upon standing for only ½ hour.

Part E

The method of part A was repeated except that pentachlorophenol was incorporated into the reaction mass in an amount comprising about 2.0% by weight of the reaction mass. A firm, hard polyurea gel formed upon standing for only ½ hour.

Having thus described the invention, what is claimed is:

1. In the process for forming a cured polyurea polymer from a reaction mixture containing a polyfunctional-isocyanate of the formula,

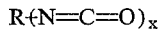

wherein R is a saturated hydrocarbyl group having a valence of $x$, wherein $x$ is an integer from 2 to 4; and a polyfunctional-imine which is the reaction product of an amine of the formula,

wherein R is a saturated hydrocarbyl group having a valence of $x$, wherein $x$ is an integer from 2 to 4 and a ketone or aldehyde, the improvement which comprises: catalyzing the curing of said polyurea polymer through the presence of an effective amount of phenolic compound of the formula,

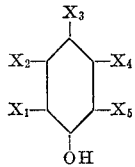

wherein $X_1$, $X_2$, $X_3$, $X_4$ and $X_5$ are selected from the group consisting of H, and chlorine.

2. The process of claim 1 wherein said phenolic compound is present in said reaction mixture in an amount comprising about 0.1% to about 5% by weight of said reaction mixture.

3. The process of claim 1 wherein said polyfunctional-isocyanate is an alkylene diisocyanate and said polyfunctional imine is an alkylene diimine.

4. The process of claim 3 wherein said phenolic compound is pentachlorophenol.

5. The process of claim 4 wherein said pentachlorophenol is present in an amount comprising about 0.5% to about 3% of said reaction mixture.

6. The process for coating a substrate with a tough, hard, chemically durable polyurea film wherein polyurea is polymerized in situ on said substrate, comprising the steps of:

applying to said substrate a reaction mixture containing a polyfunctional isocyanate of the formula,

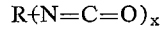

wherein R is a saturated hydrocarbyl group having a valence of $x$, wherein $x$ is an integer from 2 to 4; and a polyfunctional imine, said imine comprising the reaction product of an amine of the formula,

wherein R is a saturated hydrocarbyl group having a valence of $x$, wherein $x$ is an integer from 2 to 4; and a ketone or aldehyde curing said reaction mixture to form said polyurea in the presence of an effective catalytic amount of a phenolic compound of the formula,

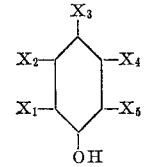

wherein $X_1$, $X_2$, $X_3$, $X_4$ and $X_5$ are selected from the group consisting of H and chlorine, whereby the curing rate of said polyurea is materialy increased.

7. The process of claim 6 wherein said substrate is a cellulosic substrate.

8. The process of coating a substrate according to claim 6 wherein a plurality of coating layers are superimposed on said substrate, and the exposed layer is a tough, hard, chemically durable, polyurea film.

9. The process of claim 7 wherein said phenolic compound is applied to said substrate prior to the application of said reaction mixture.

10. The process of claim 9 wherein said substrate is wood.

11. The process of claim 10 wherein said polyfunctionalimine is an alkylene diimine.

12. The process of claim 11 wherein said phenolic compound is pentachlorophenol.

References Cited

UNITED STATES PATENTS

| | | | |
|---|---|---|---|
| 1,841,420 | 1/1932 | Sperr | 252—426X |
| 2,382,374 | 8/1945 | Wood | 117—147 |
| 3,006,898 | 10/1961 | Waiter | 260—858 |
| 3,105,773 | 10/1963 | Frank | 117—148 |
| 3,325,346 | 6/1967 | Osborg | 260—77.5 |
| 3,267,078 | 8/1966 | Damusis | 117—161 |
| 3,267,077 | 8/1966 | Windemuth | 117—161 |

FOREIGN PATENTS

| | | | |
|---|---|---|---|
| 656,950 | 1/1963 | Canada | 117—161 |

WILLIAM D. MARTIN, Primary Examiner

W. K. TRENOR, Assistant Examiner

U.S. Cl. X.R.

117—126, 132, 143, 148, 161; 252—441; 260—77.5, 83.7, 553, 858